United States Patent
Wu et al.

(10) Patent No.: US 10,584,576 B2
(45) Date of Patent: Mar. 10, 2020

(54) WELL RANGING APPARATUS, SYSTEMS, AND METHODS

(71) Applicant: Halliburton Energy Services, Inc., Houston, TX (US)

(72) Inventors: Hsu-Hsiang Wu, Sugar Land, TX (US); Yijing Fan, Singapore (SG)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 14/769,533

(22) PCT Filed: Aug. 4, 2015

(86) PCT No.: PCT/US2015/043577
§ 371 (c)(1),
(2) Date: Aug. 21, 2015

(87) PCT Pub. No.: WO2016/025235
PCT Pub. Date: Feb. 18, 2016

(65) Prior Publication Data
US 2016/0258275 A1  Sep. 8, 2016

Related U.S. Application Data

(60) Provisional application No. 62/078,732, filed on Nov. 12, 2014, provisional application No. 62/037,440, (Continued)

(51) Int. Cl.
*E21B 47/022* (2012.01)
*G01V 3/26* (2006.01)
(Continued)

(52) U.S. Cl.
CPC .......... *E21B 47/02216* (2013.01); *E21B 7/04* (2013.01); *E21B 33/14* (2013.01);
(Continued)

(58) Field of Classification Search
CPC .... G01V 3/10; G01V 3/26; E21B 7/04; E21B 33/14; E21B 47/12; E21B 47/024; E21B 47/122
See application file for complete search history.

(56) References Cited

U.S. PATENT DOCUMENTS

4,372,398 A    2/1983   Kuckes
4,443,762 A    4/1984   Kuckes
(Continued)

FOREIGN PATENT DOCUMENTS

WO    WO-2007/015087 A1    2/2007
WO    WO-2012/134468 A1    10/2012
(Continued)

OTHER PUBLICATIONS

Definition of cement accessed through Schlumberger Oilfield Glossary on Nov. 15, 2016 via http://www.glossary.oilfield.slb.com/Terms/c/cement.aspx.*
(Continued)

*Primary Examiner* — Taras P Bemko
*Assistant Examiner* — Manuel C Portocarrero
(74) *Attorney, Agent, or Firm* — Gilliam IP PLLC (57) ABSTRACT

Disclosed embodiments include well ranging apparatus and systems that comprise well casing material installed in a well, well cement attached to the well casing material, and a device to conduct electromagnetic waves, the device disposed along a length of the well, substantially parallel to the well casing material, the device to be used in direct transmission or backscatter transmission of ranging signals. In some embodiments, the device comprises at least one of a conductor, an insulated conductor, a coaxial cable, a waveguide, a capacitor, or an inductor. Additional apparatus, systems, and methods are disclosed.

29 Claims, 6 Drawing Sheets

Related U.S. Application Data filed on Aug. 14, 2014, provisional application No. 62/035,877, filed on Aug. 11, 2014.

(51) Int. Cl.

| | | |
|---|---|---|
| *E21B 7/04* | (2006.01) | |
| *E21B 33/14* | (2006.01) | |
| *E21B 47/024* | (2006.01) | |
| *G01V 99/00* | (2009.01) | |
| *G06F 17/11* | (2006.01) | |
| *E21B 43/24* | (2006.01) | |
| *E21B 47/12* | (2012.01) | |
| *E21B 47/18* | (2012.01) | |

(52) U.S. Cl.
CPC .............. *E21B 47/024* (2013.01); *G01V 3/26* (2013.01); *G01V 99/005* (2013.01); *G06F 17/11* (2013.01); *E21B 43/2406* (2013.01); *E21B 47/12* (2013.01); *E21B 47/122* (2013.01); *E21B 47/18* (2013.01)

(56) References Cited

U.S. PATENT DOCUMENTS

| | | | |
|---|---|---|---|
| 4,700,142 A | | 10/1987 | Kuckes |
| 4,763,520 A | * | 8/1988 | Titchener ................. E21B 43/26 340/854.6 |
| 4,933,640 A | | 6/1990 | Kuckes |
| 5,065,100 A | | 11/1991 | Vail, III |
| 5,084,678 A | | 1/1992 | Hutin |
| 5,189,415 A | | 2/1993 | Shimada et al. |
| 5,230,387 A | | 7/1993 | Waters et al. |
| 5,258,755 A | | 11/1993 | Kuckes |
| 5,305,212 A | | 4/1994 | Kuckes |
| 5,485,089 A | | 1/1996 | Kuckes |
| 5,512,830 A | | 4/1996 | Kuckes |
| 5,582,248 A | | 12/1996 | Estes |
| 5,589,775 A | * | 12/1996 | Kuckes .............. E21B 47/02216 166/66.5 |
| 5,923,170 A | | 7/1999 | Kuckes |
| 6,179,066 B1 | | 1/2001 | Nasr et al. |
| 6,525,540 B1 | | 2/2003 | Kong et al. |
| 6,985,814 B2 | | 1/2006 | Mcelhinney |
| 7,268,552 B1 | | 9/2007 | Gerald, II et al. |
| 7,703,548 B2 | | 4/2010 | Clark |
| 7,719,282 B2 | | 5/2010 | Fanini et al. |
| 7,866,386 B2 | * | 1/2011 | Beer ...................... E21B 43/24 166/258 |
| 7,962,287 B2 | | 6/2011 | Clark |
| 7,969,819 B2 | | 6/2011 | Hall et al. |
| 8,011,451 B2 | | 9/2011 | MacDonald |
| 8,126,650 B2 | | 2/2012 | Lu et al. |
| 8,237,443 B2 | | 8/2012 | Hopmann et al. |
| 8,324,912 B2 | | 12/2012 | Waid |
| 8,462,012 B2 | | 6/2013 | Clark et al. |
| 8,680,866 B2 | | 3/2014 | Marsala et al. |
| 8,749,243 B2 | | 6/2014 | Bittar et al. |
| 8,844,648 B2 | | 9/2014 | Bittar et al. |
| 9,404,354 B2 | | 8/2016 | Sugiura |
| 9,581,718 B2 | | 2/2017 | Rodney |
| 9,702,240 B2 | | 7/2017 | Bittar et al. |
| 2002/0000808 A1 | | 1/2002 | Nichols |
| 2003/0137297 A1 | | 7/2003 | Ganesan |
| 2004/0163443 A1 | | 8/2004 | McElhinney |
| 2005/0218898 A1 | | 10/2005 | Fredette et al. |
| 2006/0113112 A1 | | 6/2006 | Waters |
| 2006/0131013 A1 | | 6/2006 | McElhinney |
| 2007/0126426 A1 | | 6/2007 | Clark et al. |
| 2007/0187089 A1 | * | 8/2007 | Bridges .................. E21B 36/04 166/248 |
| 2008/0000686 A1 | | 1/2008 | Kuckes et al. |
| 2008/0177475 A1 | | 7/2008 | McElhinney et al. |
| 2008/0275648 A1 | | 11/2008 | Illfelder |
| 2009/0164127 A1 | | 6/2009 | Clark |
| 2009/0178850 A1 | | 7/2009 | Waters et al. |
| 2009/0260878 A1 | | 10/2009 | Morley et al. |
| 2009/0308657 A1 | | 12/2009 | Clark et al. |
| 2010/0194395 A1 | | 8/2010 | Mcelhinney |
| 2010/0300756 A1 | | 12/2010 | Bergstrom et al. |
| 2010/0332137 A1 | | 12/2010 | Meadows et al. |
| 2011/0015862 A1 | | 1/2011 | Sato et al. |
| 2011/0018542 A1 | | 1/2011 | Clark et al. |
| 2011/0088890 A1 | | 4/2011 | Clark |
| 2011/0284731 A1 | | 11/2011 | Roscoe et al. |
| 2011/0290011 A1 | | 12/2011 | Dowla et al. |
| 2011/0308794 A1 | | 12/2011 | Bittar et al. |
| 2011/0308859 A1 | | 12/2011 | Bittar et al. |
| 2011/0309836 A1 | | 12/2011 | Bittar et al. |
| 2012/0001637 A1 | | 1/2012 | Bittar et al. |
| 2012/0013339 A1 | | 1/2012 | Kuckes |
| 2012/0109527 A1 | | 5/2012 | Bespalov et al. |
| 2012/0139543 A1 | | 6/2012 | McElhinney et al. |
| 2012/0158305 A1 | | 6/2012 | Rodney et al. |
| 2012/0257475 A1 | | 10/2012 | Luscombe et al. |
| 2012/0273192 A1 | * | 11/2012 | Schmidt ................ E21B 47/122 166/250.1 |
| 2012/0283951 A1 | | 11/2012 | Li et al. |
| 2012/0283952 A1 | | 11/2012 | Tang et al. |
| 2013/0056272 A1 | | 3/2013 | Kuckes |
| 2013/0068526 A1 | | 3/2013 | Snyder et al. |
| 2013/0069655 A1 | | 3/2013 | McElhinney et al. |
| 2013/0151158 A1 | | 6/2013 | Brooks et al. |
| 2013/0173164 A1 | | 7/2013 | Zhang |
| 2013/0184995 A1 | | 7/2013 | Sinclair et al. |
| 2013/0333946 A1 | | 12/2013 | Sugiura |
| 2014/0132272 A1 | | 5/2014 | Cuevas et al. |
| 2014/0145857 A1 | * | 5/2014 | Comparetto ............ E21B 47/12 340/854.6 |
| 2014/0191120 A1 | | 7/2014 | Donderici et al. |
| 2014/0374159 A1 | | 12/2014 | McElhinney et al. |
| 2015/0013968 A1 | | 1/2015 | Hsu et al. |
| 2015/0124562 A1 | | 5/2015 | Yoneshima et al. |
| 2015/0240623 A1 | | 8/2015 | Blangé et al. |
| 2015/0361789 A1 | | 12/2015 | Donderici et al. |
| 2015/0378044 A1 | | 12/2015 | Brooks |
| 2016/0216396 A1 | | 7/2016 | Golla et al. |
| 2016/0258276 A1 | | 9/2016 | Donderici et al. |
| 2016/0273338 A1 | | 9/2016 | Wu |
| 2016/0273339 A1 | | 9/2016 | Wu |
| 2016/0273340 A1 | | 9/2016 | Roberson et al. |
| 2016/0273341 A1 | | 9/2016 | Wu et al. |
| 2016/0273342 A1 | | 9/2016 | Wu et al. |
| 2016/0273343 A1 | | 9/2016 | Donderici et al. |
| 2016/0273344 A1 | | 9/2016 | Wu et al. |

FOREIGN PATENT DOCUMENTS

| | | |
|---|---|---|
| WO | WO-2013/162505 A1 | 10/2013 |
| WO | WO-2014/089402 A2 | 6/2014 |
| WO | 2016025230 A1 | 2/2016 |
| WO | 2016025232 A1 | 2/2016 |
| WO | 2016025235 A1 | 2/2016 |
| WO | 2016025237 A1 | 2/2016 |
| WO | 2016025238 A1 | 2/2016 |
| WO | 2016025241 A1 | 2/2016 |
| WO | 2016025245 A1 | 2/2016 |
| WO | 2016025247 A1 | 2/2016 |

OTHER PUBLICATIONS

Definition of well head accessed through Schlumberger Oilfield Glossary on Nov. 15, 2016 via http://www.glossary.oilfield.slb.com/Terms/w/wellhead.aspx.*

"International Application Serial No. PCT/US2015/043577, International Search Report dated Oct. 21, 2015", 3 pgs.

"International Application Serial No. PCT/US2015/043577, Written Opinion dated Oct. 21, 2015", 9 pgs.

"International Application Serial No. PCT/US2015/043557, International Search Report dated Oct. 19, 2015", 3 pgs.

"International Application Serial No. PCT/US2015/043557, Written Opinion dated Oct. 19, 2015", 5 pgs.

(56) References Cited

OTHER PUBLICATIONS

"International Application Serial No. PCT/US2015/043566, International Search Report dated Oct. 26, 2015", 3 pgs.
"International Application Serial No. PCT/US2015/043566, Written Opinion dated Oct. 26, 2015", 11 pgs.
"International Application Serial No. PCT/US2015/043580, International Search Report dated Nov. 11, 2015", 3 pgs.
"International Application Serial No. PCT/US2015/043580, Written Opinion dated Nov. 11, 2015", 9 pgs.
"International Application Serial No. PCT/US2015/043587, International Search Report dated Oct. 26, 2015", 3 pgs.
"International Application Serial No. PCT/US2015/043587, Written Opinion dated Oct. 26, 2015", 11 pgs.
"International Application Serial No. PCT/US2015/043604, International Search Report dated Oct. 28, 2015", 3 pgs.
"International Application Serial No. PCT/US2015/043604, Written Opinion dated Oct. 28, 2015", 14 pgs.
"International Application Serial No. PCT/US2015/043621, International Search Report dated Oct. 19, 2015", 3 pgs.
"International Application Serial No. PCT/US2015/043621, Written Opinion dated Oct. 19, 2015", 5 pgs.
"International Application Serial No. PCT/US2015/043639, International Search Report dated Oct. 27, 2015", 3 pgs.
"International Application Serial No. PCT/US2015/043639, Written Opinion dated Oct. 27, 2015", 10 pgs.
Van Dongen, "A Directional Borehole Radar System for Subsurface Imaging", DUP Science, Jan. 1, 2002, 111 pgs.
CA First Exam Report; Application Serial No. 2,954,723 ; dated Dec. 5, 2017, 3 Pages.
CA First Exam Report; Application Serial No. 2,954,303; dated Nov. 29, 2017, 5 pages.
CA First Exam Report Application Serial No. 2,954,301; dated Nov. 29, 2017, 6 pages.
CA Application Serial No. 2954674, Examiner's Letter, dated Dec. 12, 2017, 3 pages.
CA application serial No. 2954726 Examiner's Letter dated Dec. 12, 2017, 3 pages.
GCC Application Serial No. 2015/29856; Second Examination Report; dated Jun. 24, 2018, 3 pages.
GCC Application Serial No. 2015/29857; Second Examination Report; dated Jun. 24, 2018, 3 pages.
GCC Application Serial No. 2015/29873; Second Examination Report; dated Jun. 24, 2018, 3 pages.
GCC Application Serial No. 2015/29871; 2nd Examination Letter: dated Aug. 30, 2018, 4 pages.
GCC Application Serial No. 2015/29874; Second Examination Report; dated Jun. 24, 2018, 4 pages.
Canadian Application Serial No. 2,954,303; Examiner's Letter; dated Jul. 24, 2018, 5 pages.
Canadian Application No. 2,954,666; Examiner's Letter; dated Jul. 30, 2018, 6 pages.
Canadian Application Serial No. 2,954,657; Examiner's Letter; dated Jun. 5, 2018, 4 pages.
Canadian Application Serial No. 2,954,668; Examiner's Letter; dated Jun. 6, 2018, 4 pages.
GCC Application Serial No. 2015/29857; GCC Examination Report; dated Jan. 23, 2018, 4 pages.
GCC Application Serial No. 2015/29856, GCC Examination Report; dated Jan. 23, 2018, 4 pages.
GCC Application Serial No. 2015/29871, GCC Examination Report, dated Feb. 28, 2018, 5 pages.
Canadian Application Serial No. 2,954,301; Examiner's Letter; dated Jun. 1, 2018, 6 pages.
GCC Application Serial No. 2015/29874; GCC Examination Report; dated Jan. 23, 2018, 6 pages.
GCC Application Serial No. 2015/29873; GCC Examination Report; dated Feb. 8, 2018, 8 pages.
GCC Application Serial No. 2015/29872; Examination Report; dated Nov. 22, 2018, 4 pages.
CA Application Serial No. 2,954,301, Office Action 3, dated Mar. 1, 2019, 5 pages.
U.S. Appl. No. 14/769,512, Notice of Allowance, dated Aug. 14, 2019, 9 pages.
U.S. Appl. No. 14/769,539, Non-Final Office Action, dated Aug. 7, 2019, 25 pages.
CA Application Serial No. 2,954,666; Examiner's Letter; dated Apr. 17, 2019, 5 pages.
CA Application Serial No. 2,954,303, Office Action, dated Apr. 24, 2019, 5 pages.
CA Application Serial No. 2,954,657; Examiner's Letter; dated Dec. 5, 2017, 3 pages.
CA Application Serial No. 2,954,668, Office Action, dated Mar. 5, 2019, 5 pages.
CA Application Serial No. 2,954,668; Examiner's Letter; dated Dec. 12, 2017, 5 pages.
GCC Application Serial No. 2015/29861, GCC Examination Report; dated Jan. 23, 2018, 5 pages.
GCC Application Serial No. 2015/29864, GCC Examination Report; dated Nov. 22, 2018, 5 pages.
U.S. Appl. No. 14/769,512, Final Office Action, dated May 3, 2019, 19 pages.
U.S. Appl. No. 14/769,539, Final Office Action, dated Dec. 7, 2017, 19 pages.
U.S. Appl. No. 14/769,548, Non-Final Office Action, dated Mar. 11, 2019, 30 pages.
U.S. Appl. No. 15/666,137, Non-Final Office Action, dated Dec. 5, 2018, 7 pages.
U.S. Appl. No. 14/769,548, Final Office Action, dated Jun. 27, 2019, 30 pages.
U.S. Appl. No. 15/666,137, Non-Final Office Action, dated Jun. 24, 2019, 6 pages.

* cited by examiner

WELL RANGING APPARATUS, SYSTEMS, AND METHODS

CROSS-REFERENCE TO RELATED APPLICATIONS

The present application is a U.S. National Stage Filing under 35 U.S.C. 371 from International Application No. PCT/US2015/043577, filed on 4 Aug. 2015, which application claims the benefit of priority to provisional application Ser. No. 62/035,877, filed Aug. 11, 2014; provisional application Ser. No. 62/037,440, filed Aug. 14, 2014; and provisional application Ser. No. 62/078,732, filed Nov. 12, 2014; each of which is incorporated herein by reference in its entirely.

BACKGROUND

With much of the world's easily obtainable oil having already been produced, new techniques are being developed to extract less accessible hydrocarbons. These techniques often involve drilling a borehole in close proximity to one or more existing wells. Examples of directed drilling near an existing well include well intersection for blowout control, multiple wells drilled from an offshore platform, and closely spaced wells for geothermal energy recovery. Another such technique is steam-assisted gravity drainage (SAGD) that uses a pair of vertically-spaced, horizontal wells constructed along a substantially parallel path, often less than ten meters apart. Careful control of the spacing contributes to the effectiveness of the SAGD technique.

One way to construct a borehole in close proximity to an existing well is "active ranging" or "access-dependent ranging" in which an electromagnetic source is located in the existing well and monitored via sensors on the drill string in the well under construction. Another technique involves systems that locate both the source and the sensor(s) on the drill string—relying on backscatter transmission from the target well to determine the range between the drilling well and the target well. These latter systems are sometimes called "passive ranging" or "access-independent" systems by those of ordinary skill in the art. In either case, the ranging techniques are sometimes limited in the degree of accuracy that can be obtained.

DETAILED DESCRIPTION

Introduction

Magnetic ranging has been widely used for various applications, including well intersection, well avoidance, SAGD, and others. One excitation method for magnetic ranging is surface excitation. Surface excitation is a popular method of generating a ranging signal. It is relatively easy to implement, without the need for complex cabling and equipment. When surface excitation is used, a current is injected into a target well casing at the surface of the well (e.g., at the well head). The current travels along the casing down-hole and generates a magnetic field down-hole that originates from the target via direct transmission, and can be measured at a distance (e.g., in a drilling well) for ranging purposes. As a result, the excitation signal down-hole may be relatively weak when the distance beneath the surface is great, due to the current leakage into the conductive formation. Consequently, sensor noise often affects magnetic ranging accuracy at greater depths, leading to false signal measurements and failures in well location. Some of the embodiments described herein are designed to improve down-hole current strength and/or enhance the signal/noise ratio, for improved accuracy with respect to ranging measurement technology.

Such apparatus, methods, and systems can be even more useful when backscatter ranging is used: that is, when the excitation source is injected into the casing of the drilling well, or is attached to a drill string within the drilling well. In the case of backscatter ranging, the excitation source originates a direct transmission signal that impinges upon, and is then reflected from, the target well. When these backscatter transmission signals are received at a receiver in the drilling well, the resulting received ranging signals are even weaker than in the direct transmission case.

Thus, novel apparatus, methods, and systems are proposed to increase the strength of the received ranging signal, to improve the received signal-to-noise ratio (SNR), and to improve the accuracy of ranging signal measurements. In some embodiments, enhancements are realized in all three of these areas. By taking this approach, ranging system technology can be improved in a number of ways, via improved accuracy and reliability of individual ranging measurements. Therefore, the apparatus, methods, and systems proposed herein can be used to reduce measurement issues that arise due to noise, as well as to generate larger signals at great depths. The result is that the maximum detection ranges for existing ranging systems can be significantly improved. In some embodiments, the apparatus, methods, and systems described herein can be applied to electromagnetic (EM) telemetry applications.

Figure 1:
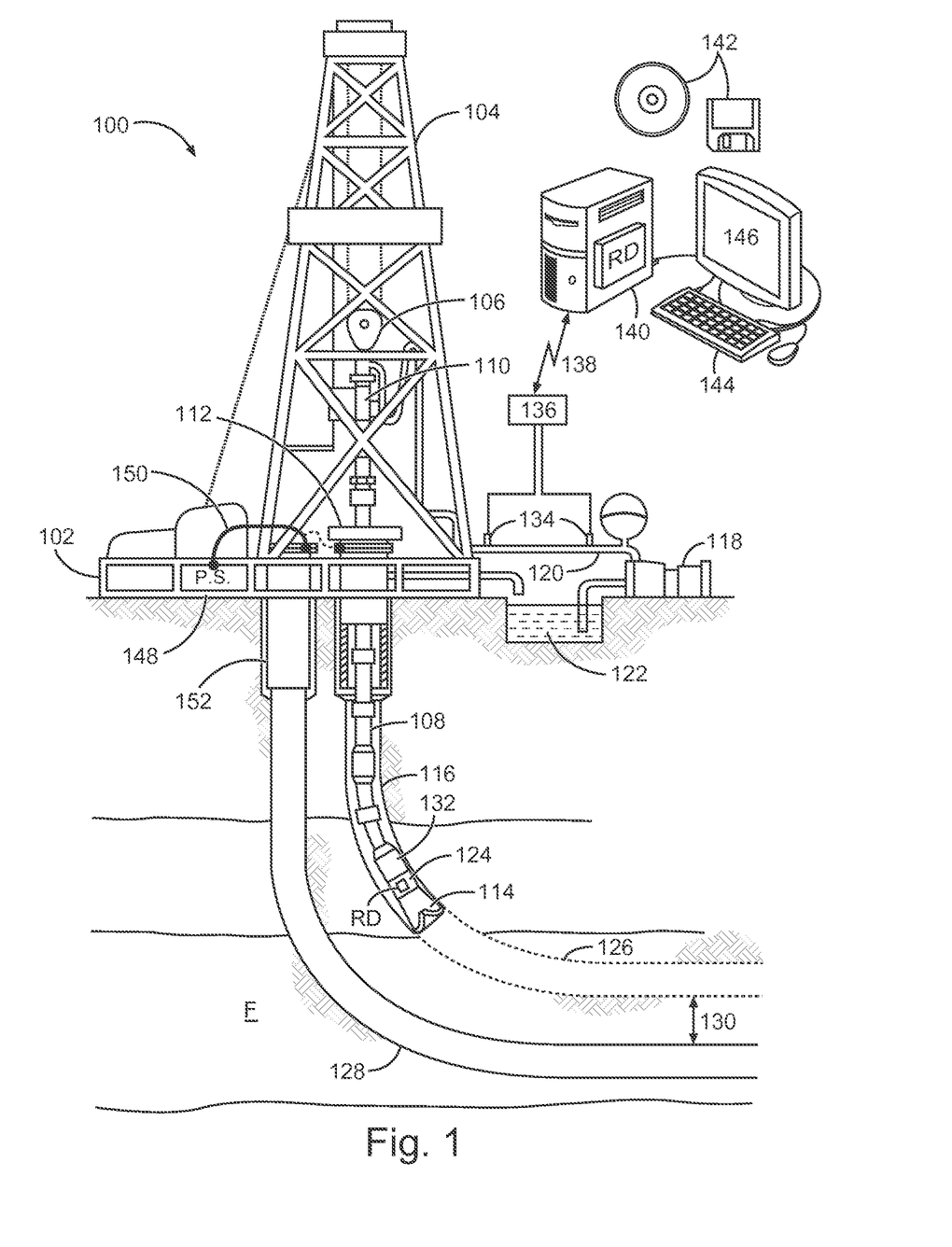
FIG. 1 depicts an example drilling environment in which ranging embodiments may be employed.

FIG. 1 depicts an example drilling environment 100 in which ranging embodiments may be employed. The disclosed apparatus (e.g., logging tools), systems, and methods are best understood in the context of the larger systems in which they operate. Accordingly, FIG. 1 illustrates an example drilling environment 100 in which a drilling platform 102 supports a derrick 104 having a traveling block 106 for raising and lowering a drill string 108. A top drive 110 supports and rotates the drill string 108 as it is lowered through the well-head 112. A drill bit 114 is driven by a downhole motor and/or rotation of the drill string 108. As the drill bit 114 rotates, it creates a borehole 116 that passes through various formations F. A pump 118 circulates drilling fluid through a feed pipe 120 to top drive 110, downhole through the interior of drill string 108, through orifices in drill bit 114, back to the surface via the annulus around drill string 108, and into a retention pit 122. The drilling fluid transports cuttings from the borehole into the retention pit 122 and aids in maintaining the borehole integrity.

The drill bit 114 is just one piece of a bottom-hole assembly that includes one or more drill collars (comprising thick-walled steel pipe) to provide weight and rigidity to aid the drilling process. Some of these drill collars include logging instruments to gather measurements of various drilling parameters such as position, orientation, weight-on-bit, borehole diameter, etc. The tool orientation may be specified in terms of a tool face angle (also known as rotational or azimuthal orientation), an inclination angle (the slope), and a compass direction, each of which can be derived from measurements made by magnetometers, inclinometers, and/or accelerometers, though other sensor types such as gyroscopes may also be used. In one specific embodiment, the tool includes a three-axis fluxgate magnetometer and a three-axis accelerometer. As is known in the art, the combination of these two sensor systems enables the measurement of the tool face angle, inclination angle, and compass direction. In some embodiments, the tool face and hole inclination angles are calculated from the accelerometer sensor output, and the magnetometer sensor outputs are used to calculate the compass direction.

The bottom-hole assembly further includes a ranging tool 124 to receive signals from current injected by a power supply 148 into nearby conductors such as pipes, casing strings, and conductive formations and to collect measurements of the resulting field to determine distance and direction. Using measurements of these signals, in combination with the tool orientation measurements, the driller can, for example, steer the drill bit 114 along a desired path in the drilling well 126 relative to the existing well (e.g., target well) 128 in formation F using any one of various suitable directional drilling systems, including steering vanes, a "bent sub", and a rotary steerable system. For precision steering, the steering vanes may be the most useful steering mechanism. The steering mechanism can be controlled from the Earth's surface, or downhole, with a downhole controller programmed to follow the existing borehole 128 at a predetermined distance 130 and position (e.g., directly above or below the existing borehole).

The ranging tool 124 may comprise one or more elements, interchangeably designated as receivers or sensors in this document. These elements may comprise uniaxial, biaxial, or triaxial magnetometers, coil antennas, and/or telemetry receivers.

A telemetry sub 132 coupled to the downhole tools (including ranging tool 124) transmits telemetry data to the surface via mud pulse telemetry. A transmitter in the telemetry sub 132 modulates a resistance to drilling fluid flow to generate pressure pulses that propagate along the fluid stream at the speed of sound to the surface. One or more pressure transducers 134 convert the pressure signal into electrical signal(s) for a signal digitizer 136. Note that other forms of telemetry exist and may be used to communicate signals from downhole to the digitizer. Such telemetry may include acoustic telemetry, electromagnetic telemetry, or telemetry via wired drill pipe.

The digitizer 136 supplies a digital form of the telemetry signals via a communications link 138 to a computer 140 or some other form of a data processing device. The computer 140 operates in accordance with software (which may be stored on non-transitory information storage media 142) and user input provided via an input device 144 to process and decode the received signals. The resulting telemetry data may be further analyzed and processed by the computer 140 to generate a display of useful information on a computer monitor 146 or some other form of a display device. For example, a driller could employ this system to obtain and monitor drilling parameters, formation properties, and the path of the borehole relative to the existing borehole 128 and any detected formation boundaries. A downlink channel can then be used to transmit steering commands from the surface to the bottom-hole assembly. In some embodiments, the computer 140 has analog circuitry installed or is programmed to include a ranging determination module RD, which operates on the signal data received down hole at the ranging tool 124 to determine the distance and direction from the drilling well 126 to the target well 128. The ranging determination module RD may exist in the computer 140 or the tool 124, and may be used to implement any of the methods described herein.

Thus, FIG. 1 illustrates an electromagnetic ranging, system with surface excitation. The power supply 148 at the surface employs a cable 150 to inject current into target well casing 152 and flowing down-hole so that magnetic fields can be generated surrounding a target well 128. Then sensors in the ranging tool 124 in the drilling well 126 can determine the magnetic field strength in various directions so that distance and direction between the target well 128 and drilling well 126 can be determined.

The drilling well 126 and the target well 128 are often constructed as a cased hole, with cement installed around the outside of the casing material (e.g., conductive piping). In the completion phase of oil and gas wells, the cement serves to isolate the wellbore, helps prevent casing failure, and keeps the wellbore, fluids from contaminating freshwater aquifers.

When conventional ranging systems are used, it is sometimes difficult to determine the range to a target well, when the target well is already in production, or the target well is surrounded by other cased wells. For example, this problem often arises when some portion of one or more of the wells involved in the measurement process is surrounded by water.

As a solution to this technical problem, the inventors have developed a variety of apparatus, systems, and methods. These will be explained in the context of cross-well ranging applications, where a ranging tool is used to determine the ranging distance between wells, when two or more cased-hole wells are nearby. Included are ranging applications for shallow well depths, and those within highly conductive formations, such as water. The result of implementing various embodiments may be improved accuracy when determining the range between a number of closely-situated wells, or wells in water. Sensor noise effects on ranging performance may also be reduced. Several embodiments that may provide some of these advantages will now be described.

Detailed Presentation

Figure 2:
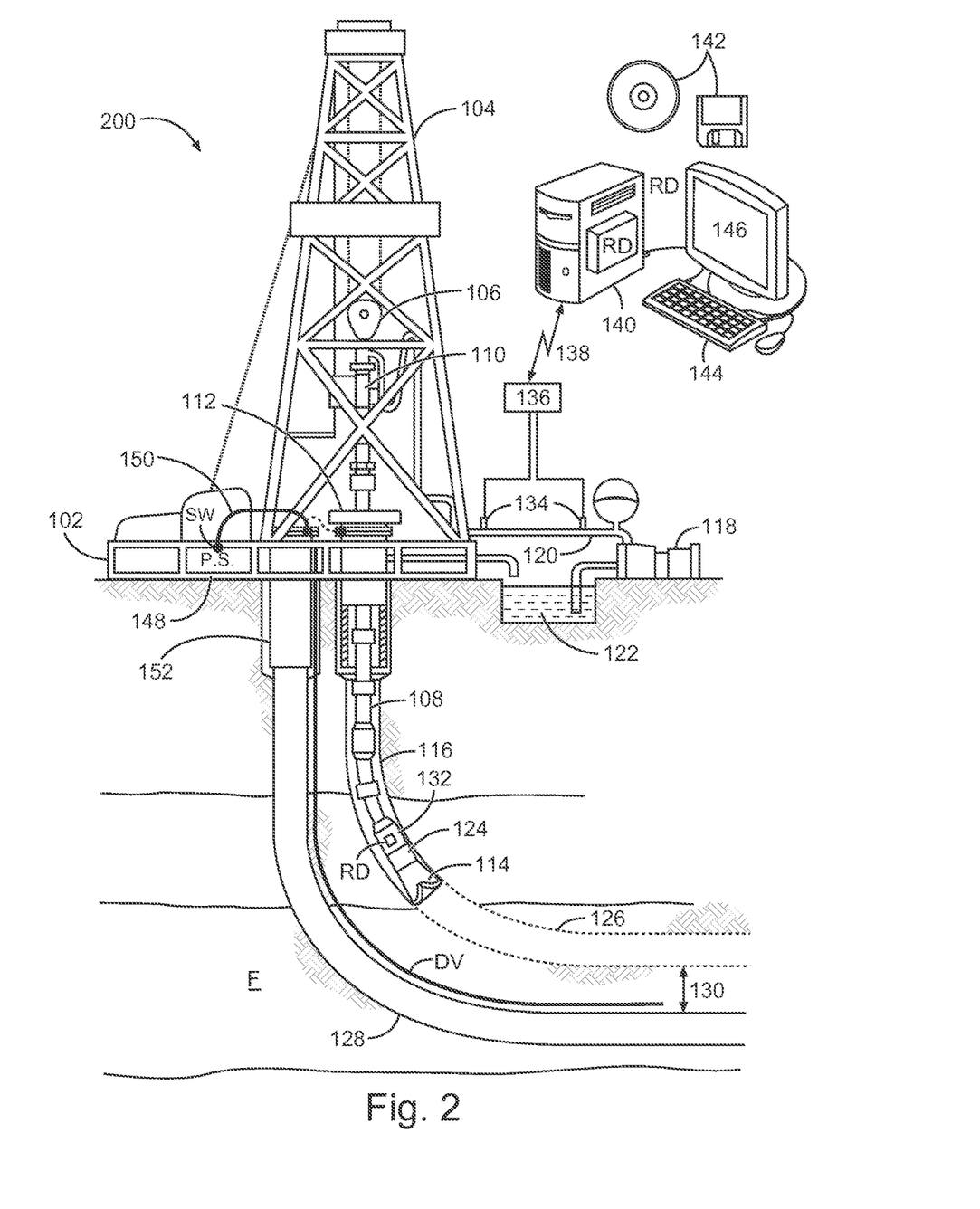
FIG. 2 depicts an example drilling environment in which ranging embodiments may be employed.

FIG. 2 depicts an example drilling environment 200 in which ranging embodiments may be employed. Here, an electromagnetic ranging system with surface excitation is illustrated. The power supply 148 at the surface employs a cable 150 to inject current into target well casing 152 (or optionally, into the casing of the drilling well 126) and flowing to down-hole so that magnetic fields can be generated surrounding a target well 128 (or the drilling well 126, when backscatter transmission from the target well 128 is used to determine the range between the wells 126 and 128). Then sensors in the ranging tool 124 (e.g., one or more magnetometers) in the drilling well 126 can determine the magnetic field strength in various directions so that distance and direction between the target well 128 and drilling well 126 can be determined.

The drilling well 126 and the target well 128 are often constructed as a cased hole, with cement installed around the outside of the casing material (e.g., conductive piping). In the completion phase of oil and gas wells, the cement serves to isolate the wellbore, helps prevent casing failure, and keeps the wellbore fluids from contaminating freshwater aquifers.

When it is known ahead of time that a particular well will be used as a ranging target (e.g., the target well 128), a device DV can be permanently installed along with or in that well as part of the well completion process, before production begins. The device DV may use electromagnetic waves in a variety of ways. For example, the device DV may comprise a conductor or an insulated conductor, such as a piece of wire or cable, or a coaxial cable, embedded inside the well casing or disposed between the well cement and the well casing, or inside or adjacent a completion string. The device DV may include a solenoid or switch SW connected to a source of power, to receive an electrical signal, to apply the power to the conductor, and by that action, to produce a magnetic field originating from the ranging target well that can be measured by sensors (e.g., magnetometers) in a drilling well. In some embodiments, the device DV may comprise a waveguide to receive energy through the target well casing. The device DV may comprise a capacitor or inductor to capture an electrical field (voltage difference) that can in turn be measured remotely, at the drilling well.

Figure 3:
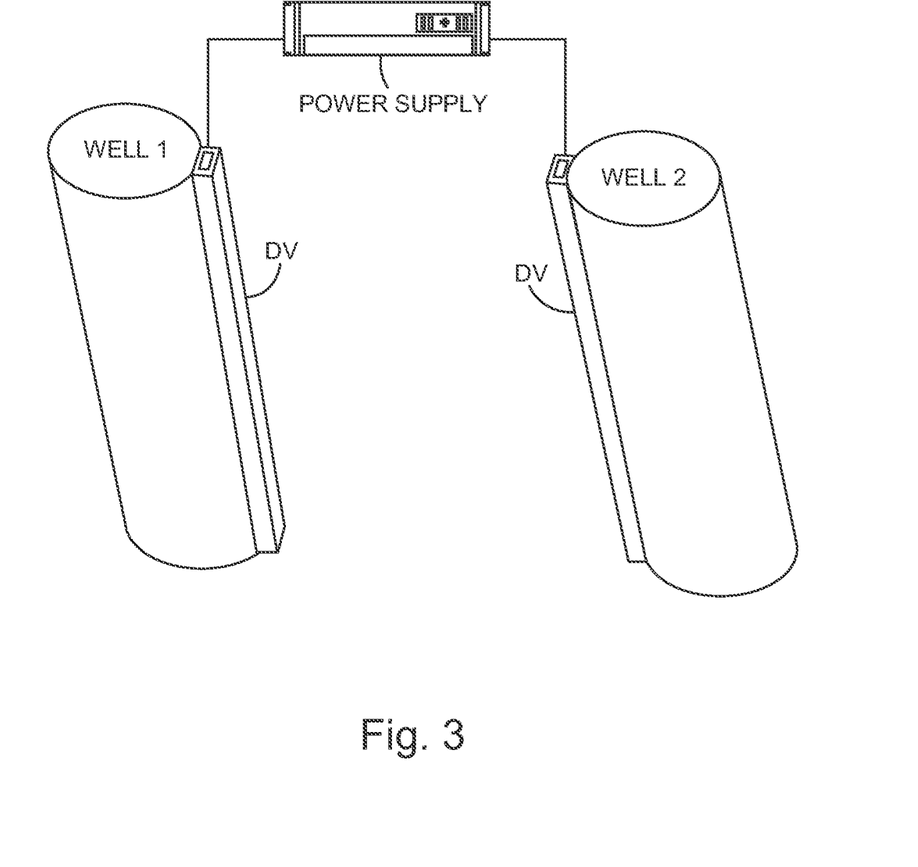
FIG. 3 illustrates a portion of an apparatus and system for various range determination embodiments.

FIG. 3 illustrates a portion of an apparatus and system for various range determination embodiments. Here two wells are indicated, Well 1 and Well 2, and a power supply at the surface is used to excite a device DV installed on each well. Thus, in some embodiments, multiple target well are included, each with an installed device, and the range is determined from the drilling well (not shown in FIG. 4-1) to one or more of the target wells. That is, multiple target wells, and installed electromagnetic wave conducting devices DV, can be substituted for the single target well and device DV that are shown in FIG. 2.

Figure 4:
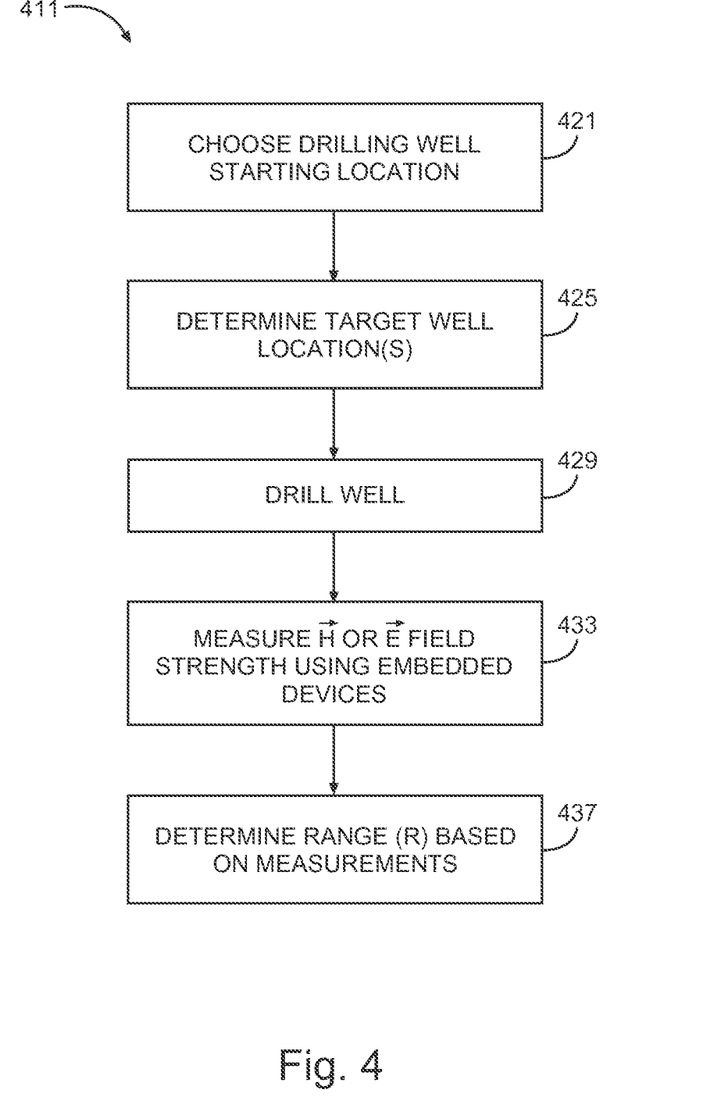
FIG. 4 is a flow diagram of a well ranging method, for various embodiments.

FIG. 4 is a flow diagram of a well ranging method 411, for various embodiments. To begin, the method 411 may include choosing a drilling well starting location at block 421. The method 411 may continue on to block 425, to include determining the location of one or more target wells—perhaps those that are closest to the drilling well location.

In some embodiments, the method 411 continues on to block 429 to include drilling the well, beginning at the starting location chosen at block 421.

In some embodiments, the method 411 includes measuring the magnetic or electrical field strength, in the drilling well, using embedded devices to generate the fields, at block 433.

In some embodiments, the method 411 includes determining a range R (see 130 in FIG. 1) between the drilling well and one or more target wells, based on the measurements, at block 437.

For example, the power supply can operate as a source to inject a current into the device DV for Well 1 and Well 2. Then a third well, Well 3, can be drilled using sensors to measure the magnetic field generated by Well 1 and Well 2. Well 3 can be constructed in the same manner as Well 2, described previously, so that in some embodiments, Well 1 and Well 2 are target wells and Well 3 is the drilling well. Sensors can be installed at any of the wells, or all wells, based on different embodiments, such as when a current is injected into Well 3, and sensors are installed in Well 1 and Well 2. Such sensor measurements can provide ranging measurements based on Ampere's law.

In some embodiments, an electrical field is generated using two wells (e.g., Well 1 and Well 2). In this case, a power supply can be used to apply a voltage potential difference between the two wells (i.e., Well 1 and Well 2), so that Well 3 is able to determine, using sensors disposed in Well 3, electrical field measurements and further translate the measurements to ranging measurements. It is noted that the device DV that is used in these embodiments can be of different types, to promote generating the desired electrical or magnetic field.

Additional Detailed Description and Some Representative Embodiments

Figure 5:
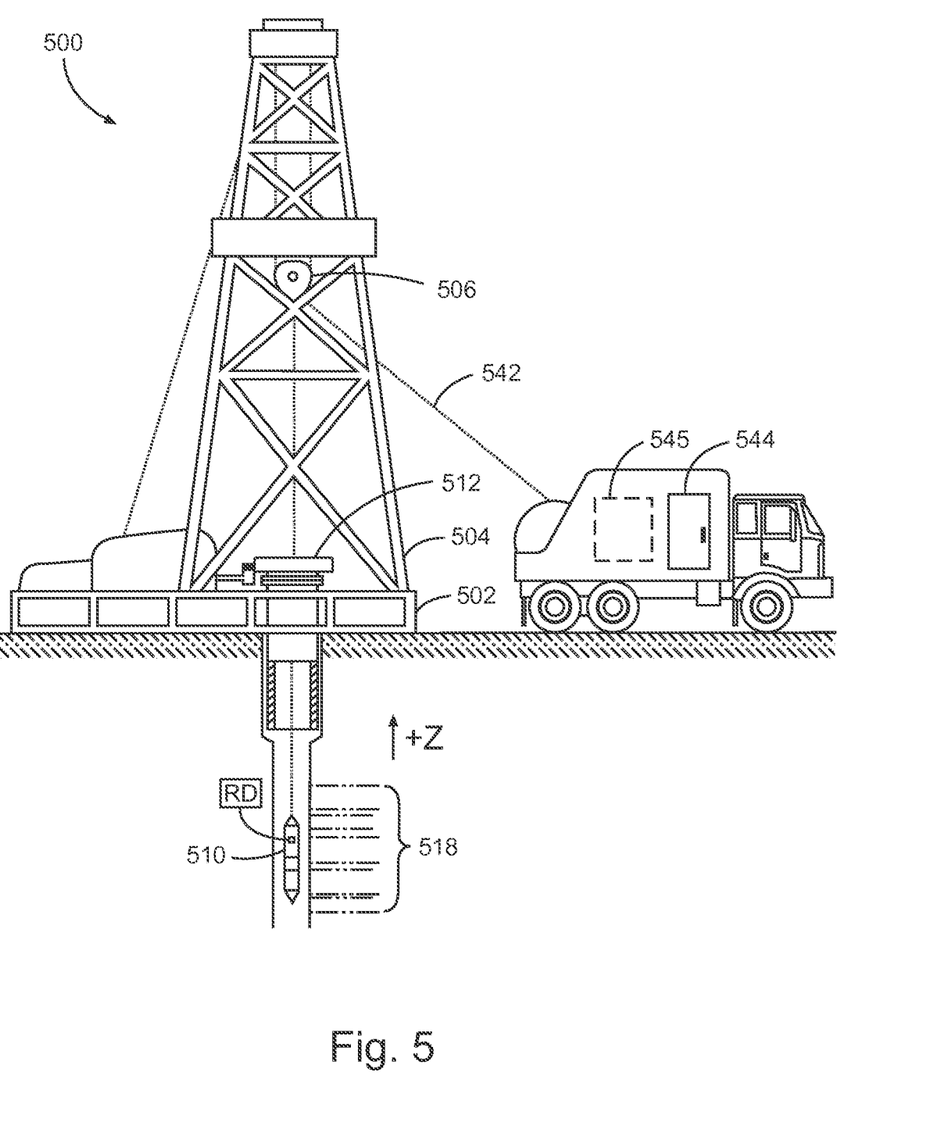
FIG. 5 is a block diagram of a wireline system implementation of various embodiments.

FIG. 5 is a block diagram of a wireline system 500 implementation of various embodiments. The system 500 of FIG. 5 may include any of the embodiments of receiver or sensor mounting discussed previously. In this case, a hoist 506 may be included as a portion of a platform 502, such as might be coupled to a derrick 504, and used to raise or lower equipment such as a wireline sonde 510 into or out of a borehole. The wireline sonde 510 may include any one or more of the above-described embodiments, including sensors and a range determination module RD.

In this wireline example, a cable 542 may provide a communicative coupling between a logging facility 544 (e.g., including a processor circuit 545 including memory or other storage or control circuitry) and the sonde 510. In this manner, information about the formation 518 may be obtained. The processor circuit 545 can be configured to access and execute instructions stored in a memory to implement any of the methods described herein (e.g., by accessing a range determination module RD).

Figure 6:
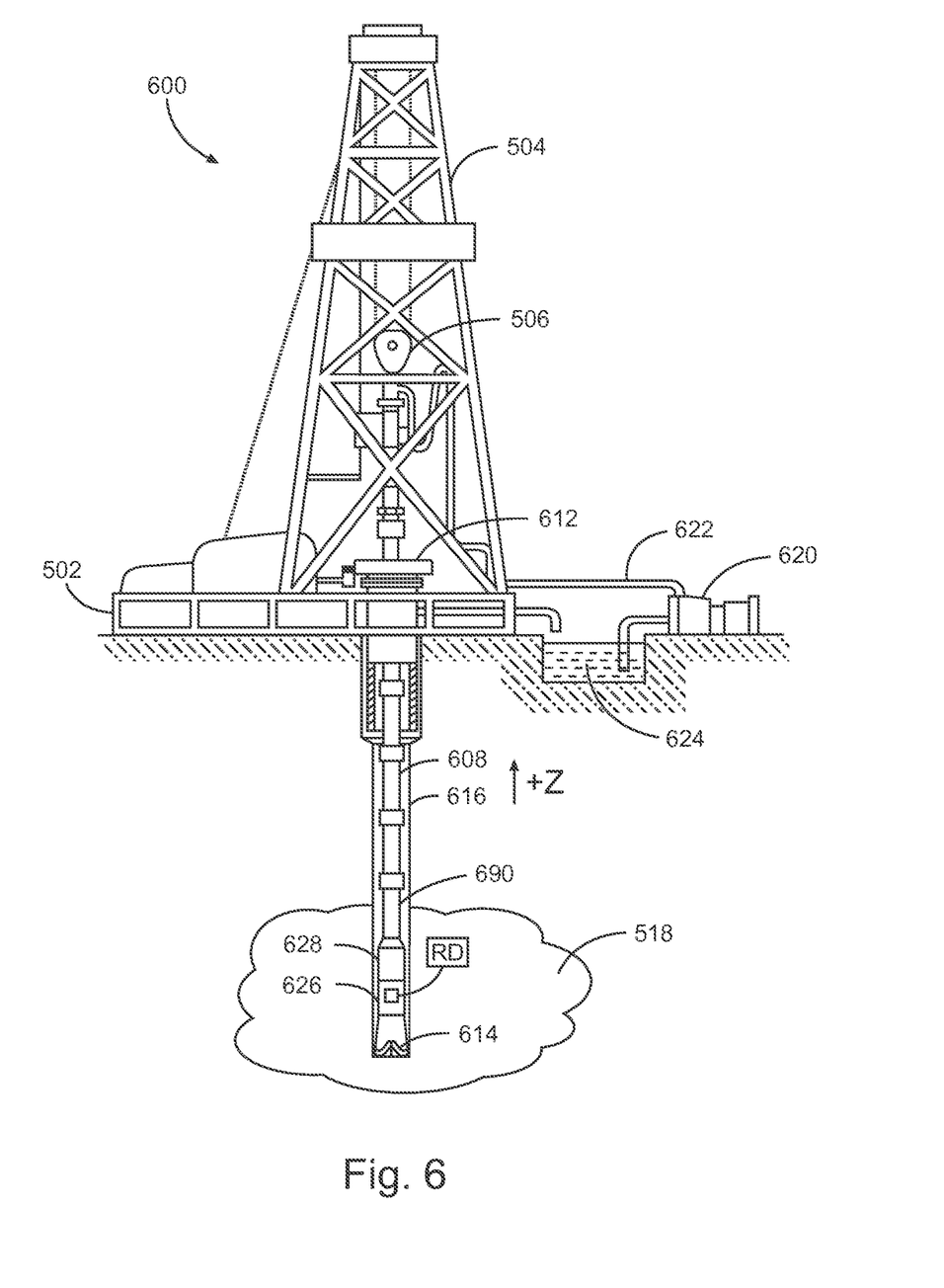
FIG. 6 is a block diagram of a drilling system implementation of various embodiments.

FIG. 6 is a block diagram of a drilling system 600 implementation of various embodiments. This diagram shows a drilling rig system 600 according to various embodiments that may include measurement while drilling (MWD) or logging while drilling (LWD) capability. The drilling apparatus can use data from an insert in the drill string 608, having attached to a number of receivers or sensors as discussed previously, and using acquired and calculated ranging information to steer the drill bit 614.

A drilling rig or platform 502 generally includes a derrick 504 or other supporting structure, such as including or coupled to a hoist 506. The hoist 506 may be used for raising or lowering equipment or other apparatus such as drill string 608. The drill string 608 may access a borehole 616, such as through a well head 512. The lower end of the drill string 608 may include various apparatus, such as a drill bit 614, such as to provide the borehole 616.

A drilling fluid or "mud" may be circulated in the annular region around the drill bit 614 or elsewhere, such as provided to the borehole 616 through a supply pipe 622, circulated by a pump 620, and returning to the surface to be captured in a retention pit 624 or sump. Various subs or tool assemblies may be located along the drill string 608, such as a bottom hole assembly (BHA) 626 or a second sub 628. The BHA 626 and/or the sub 628 may include one or more sensors or receivers, as described herein, along with a current source (e.g., power supply 148) to initiate a ranging signal, and a processor with access to a memory that contains a program to implement any of the methods described herein (e.g., a ranging determination module RD).

Thus, some of the embodiments described herein may be realized in part, as a set of instructions on a computer readable medium 142 comprising ROM, RAM, CD, DVD, hard drive, flash memory device, or any other computer readable medium, now known or unknown, that when executed causes a computing system, such as computer as illustrated in FIG. 1 or some other form of a data processing device 140, to implement portions of a method of the present disclosure, for example the processes and methods described in FIG. 4 (e.g., for computer-assisted well completion).

Though sometimes described serially in the examples of FIG. 4, one of ordinary skill in the art would recognize that other examples may reorder the operations, omit one or more operations, and/or execute two or more operations in parallel using multiple processors or a single processor organized as two or more virtual machines or sub-processors. Moreover, still other examples can implement the operations as one or more specific interconnected hardware or integrated circuit modules with related control and data signals communicated between and through the modules. Thus, any process flow is applicable to software, firmware, hardware, and hybrid implementations.

It is expected that the system range and performance can be extended with the various embodiments described herein. Power can often be saved, and accuracy of ranging measurements improved. Signal components may be extracted and converted to pixel colors or intensities and displayed as a function of tool position and azimuth. Assuming the target casing string is within detection range, it may appear as a bright (or, if preferred, a dark) band in the image. The color or brightness of the band may indicate the distance to the casing string, and the position of the band indicates the direction to the casing string. Thus, by viewing such an image, a driller can determine in a very intuitive manner whether the new borehole is drifting from the desired course and he or she can quickly initiate corrective action. For example, if the band becomes dimmer, the driller can steer towards the casing string. Conversely, if the band increases in brightness, the driller can steer away from the casing string. If the band deviates from its desired position directly above or below the casing string, the driller can steer laterally to re-establish the desired directional relationship between the boreholes.

While the text of this document has been divided into sections, it should be understood that this has been done as a matter of convenience, and that the embodiments discussed in any one section may form a part of any or more embodiments described in another section, and vice-versa. Moreover, various embodiments described herein may be combined with each other, without limitation. Thus, many embodiments may be realized.

Similarly, while some of the above-described embodiments may show only one receiver, perhaps in the form of a magnetometer, coil, or telemetry receiver, one of ordinary skill in the art would realize that a drill string or downhole tool may include multiple receivers for making the various measurements described herein. Examples of various embodiments will now be listed in a non-limiting fashion.

In some embodiments, a method comprises first casing a first well in a geological formation with well casing material, first cementing the first well and the well casing material with well cement, and prior to or during the first cementing, installing a first device to conduct electromagnetic waves along a length of the first well, substantially parallel to the well casing material used to case the first well, the first device to be used in direct transmission or backscatter transmission of ranging signals provided by the first well. In some embodiments, the first device is permanently installed by embedding the first device in the well cement used in the first cementing.

In some embodiments, the method comprises determining a range from a second well as a drilling well to the first well as a target well, based on the direct transmission of the ranging signals from the first device to sensors disposed in the drilling well.

In some embodiments, the method comprises determining a range from a second well as a drilling well to the first well as a target well, based on the backscatter transmission of the ranging signals from the drilling well to sensors disposed in the target well.

In some embodiments, the method comprises receiving the ranging signals through the well casing material, used in the first casing, by the first device comprising a waveguide.

In some embodiments, the method comprises capturing the ranging signals as a voltage difference or an electrical field by the first device comprising a capacitor or an inductor, respectively.

In some embodiments, the method comprises exciting the first device, or a second device installed along a length of a second well to conduct electromagnetic waves along a length of the second well, with a power supply coupled to a well head of the first well or the second well, respectively, to generate the electromagnetic waves.

In some embodiments, the method comprises determining a range to the first well or the second well, each comprising target wells, from a drilling well having magnetometers disposed therein to receive the electromagnetic waves.

In some embodiments, as shown in FIGS. 1-3 and 5-6, an apparatus comprises well casing material installed in a well, well cement attached to the well casing material, and a device to conduct electromagnetic waves, the device disposed along a length of the well, substantially parallel to the well casing material, the device to be used in direct transmission or backscatter transmission of ranging signals.

In some embodiments, the device comprises at least one of a conductor, an insulated conductor, a coaxial cable, or a waveguide. In some embodiments, the device comprises at least one of a capacitor or inductor.

In some embodiments, the apparatus comprises a source of current electrically coupled to the device at a well head of the well comprising a target well, to inject the current into the well casing material, to be used in the direct transmission of the ranging signals.

In some embodiments, the apparatus comprises a source of current electrically coupled to the device at a well head of the well comprising a drilling well, to inject the current into the well casing material, to be used in the backscatter transmission of the ranging signals.

In some embodiments, the apparatus comprises a source of voltage or current attached to a drill string disposed in the well comprising a drilling well, to be used in the backscatter transmission of the ranging signals.

In some embodiments, as shown in FIGS. 1-3 and 5-6, a system comprises a power supply to couple current to a first well or a second well, well casing material installed in the second well, well cement attached to the well casing material, and a device to conduct electromagnetic waves, the device disposed along a length of the second well, substantially parallel to the well casing material, the device to be used in direct transmission or backscatter transmission of ranging signals between the insulated conductor and a ranging signal receiver. In some embodiments, the system may further comprises a range determination module to receive electromagnetic field strength measurements associated with the ranging signals, and to determine an approximate range between the first well and the second well. In some embodiments, the power supply is attached to a well head of the first well or the second well.

In some embodiments, the system may comprise at least one sensor attached to a ranging tool disposed in the first well, to receive the ranging signals, the at least one sensor comprising a uniaxial, biaxial, or triaxial magnetometer, or a coil antenna.

In some embodiments, the power supply is to couple the current to the first well and the second well, each comprising a target well.

In some embodiments, the device comprises at least one of a conductor, an insulated conductor, a coaxial cable, or a waveguide. In some embodiments, the device comprises a solenoid or switch SW connected to the power supply, to receive an electrical signal, and to apply the current to the device to produce a magnetic field originating from the first well as a ranging target well.

In some embodiments, an apparatus comprises a down hole tool housing (e.g., ranging tool 124) attached to a set of sensors, the down hole tool housing comprising one or more of a wireline sonde, a bottom hole assembly, a drill collar, a drill string pipe, or a sub. Some embodiments of this apparatus further comprise a processor (e.g., computer 140) communicatively coupled to the set of sensors to receive electromagnetic signal strength signals from the sensors, and to a memory (e.g., medium 142), the memory having a set of instructions which, when executed by the processor, cause the processor to implement any of the methods described herein.

In some embodiments, a system comprises a source of current or voltage (e.g., power supply 148) to electrically couple to a well casing of a first well or to attach to a first down hole tool housing. Some embodiments of this system further comprise a drill string to be disposed in a second well and mechanically coupled to a second down hole tool housing, the second down hole tool housing attached to a set of sensors. Some embodiments of this system further comprise a processor (e.g., computer 140) communicatively coupled to the set of sensors to receive signals representing electromagnetic field strength from the sensors, in response to the source exciting the well casing directly to initiate direct signal transmission, or indirectly via backscatter transmission, the processor communicatively coupled to a memory (e.g., medium 142) having a set of instructions which, when executed by the processor, cause the processor to implement any of the methods described herein.

Numerous other variations and modifications will become apparent to those skilled in the art once the above disclosure is fully appreciated. For example, the foregoing discussion has focused on a logging while drilling implementation, but the disclosed techniques would also be suitable for wireline tool implementation (as shown in FIG. 5). It is intended that the following claims be interpreted to embrace all such variations and modifications.

In this description, references to "one embodiment" or "an embodiment," or to "one example" or "an example" mean that the feature being referred to is, or may be, included in at least one embodiment or example of the invention. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of the knowledge provided by this disclosure. Thus, the present disclosure includes a variety of combinations and/or integrations of the embodiments and examples described herein, as well as further embodiments and examples, as defined within the scope of all claims based on this disclosure, as well as all legal equivalents of such claims.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting, sense, and the scope of various embodiments is defined only by the appended claims, along with the full range of equivalents to which such claims are entitled.

What is claimed is:

1. An apparatus, comprising:
   well casing material installed in a first well and a second well;
   well cement attached around an outside of the well casing material installed in the first well and second well;
   a first transmitter that transmits first electromagnetic waves, the first transmitter disposed lengthwise between the well cement and the well casing material of the first well continuously along a length of the first well, substantially parallel to the well casing material of the first well;
   a second transmitter that transmits second electromagnetic waves, the second transmitter disposed lengthwise between the well cement and the well casing material of the second well continuously along a length of the second well, substantially parallel to the well casing material of the second well;
   a sensor disposed in a third well that determines a field strength of ranging signals corresponding to the transmitted first and second electromagnetic waves; and
   a processor configured to determine relative positioning between the third well, the first well, and the second well based on the determined field strength of the ranging signals.

2. The apparatus of claim 1, wherein the first transmitter comprises at least one of a conductor, an insulated conductor, a coaxial cable, or a waveguide disposed lengthwise between the well cement and the well casing material continuously along the length of the first well.

3. The apparatus of claim 1, wherein the first and second transmitter comprise at least one of a capacitor or inductor.

4. The apparatus of claim 1, further comprising:
   a source of current electrically coupled to the first transmitter at a well head of the first well, to inject the current into the well casing material, to be used in the direct transmission of the first electromagnetic waves as the ranging signals received by the sensor disposed in the third well.

5. The apparatus of claim 1, further comprising:
   a source of current electrically coupled to the first transmitter at a well head of the first well, to inject the current into the well casing material, to be used in the backscatter transmission of the first electromagnetic waves as the ranging signals received by the sensor disposed in the third well.

6. The apparatus of claim 1, further comprising:
   a source of voltage or current attached to a drill string disposed in the first well, to be used in the backscatter transmission of the first electromagnetic waves as the ranging signals received by the sensor disposed in the third well.

7. The apparatus of claim 1, wherein the sensor determines the field strength of the ranging signals in multiple directions, and wherein said determining relative positioning comprises determining, based on the field strength determinations in multiple directions, a distance and direction between the first target well and the drilling well.

8. The apparatus of claim 1, wherein the first transmitter comprises a device which produces the first electromagnetic waves, the device disposed lengthwise between the well cement of the first well and the well casing material of the first well continuously along a length of the first well, substantially parallel to the well casing material of the first well, wherein the device comprises a conductor which is disposed lengthwise between the well cement of the first well and the well casing material of the first well continuously along the length of the first well and which spans less than a circumference of the well casing material of the first well.

9. The apparatus of claim 1, wherein the processor is further configured to cause a band of pixels to be displayed on a display screen, wherein the band of pixels increases in brightness as the first well and second well move closer together based on the relative positioning, and the band of pixels becomes dimmer as the first well and second well move further apart based on the relative positioning.

10. The apparatus of claim 1, wherein the first transmitter comprises a device which produces the first electromagnetic waves, the device disposed lengthwise between the well cement of the first well and the well casing material of the first well continuously along a length of the first well, substantially parallel to the well casing material of the first well.

11. The apparatus of claim 1, wherein a power supply applies a voltage potential difference between the first well and the second well; and wherein the range determination module further comprises receiving, by the sensor, electric field strength measurements from the first and second well based on the applied voltage potential difference and determining the relative positioning to the third well based on the electric field strength measurements from the first and second well.

12. The apparatus of claim 1, wherein the first transmitter is a coaxial cable disposed lengthwise between the well cement and the well casing material continuously along the length of the first well.

13. A system, comprising:
a power supply to couple current to a first well and a second well;
well casing material installed in the first and second well;
well cement attached around an outside of the well casing material installed in the first and second well;
a first transmitter that transmits first electromagnetic waves, the first transmitter disposed lengthwise between the well cement of the first well and the well casing material of the first well, the first transmitter disposed continuously along a length of the first well, substantially parallel to the well casing material installed in the first well;
a second transmitter that transmits second electromagnetic waves, the second transmitter disposed lengthwise between the well cement of the second well and the well casing material of the second well, the second transmitter disposed continuously along a length of the second well, substantially parallel to the well casing material of the second well;
a sensor disposed in a third well that measures a field strength of ranging signals corresponding to the transmitted first and second electromagnetic waves; and
a range determination module to receive the field strength measurements, and to determine relative positioning between the third well, the first well, and the second well based on the received field strength measurements.

14. The system of claim 13, further comprising:
the sensor attached to a ranging tool disposed in the third well, to receive the transmitted first and second electromagnetic waves, the sensor comprising a uniaxial, biaxial, or triaxial magnetometer, or a coil antenna.

15. The system of claim 13, wherein the power supply couples the current to the first well and the second well.

16. The system of claim 13, wherein the first transmitter comprises at least one of a conductor, an insulated conductor, a coaxial cable, or a waveguide disposed lengthwise between the well cement and the well casing material continuously along the length of the first well.

17. The system of claim 13, wherein the first transmitter comprises:
a solenoid or switch connected to the power supply, to receive an electrical signal, and to apply the current to the first transmitter to produce a magnetic field originating from the first well.

18. The system of claim 13, wherein the sensor measures the field strength of the ranging signals in multiple directions, and wherein said determining relative positioning comprises determining, based on the field strength measurements in multiple directions, a distance and direction between the first target well and the drilling well.

19. The system of claim 13, wherein the first transmitter comprises a device which produces the first electromagnetic waves, the device disposed lengthwise between the well cement of the first well and the well casing material of the first well continuously along a length of the first well, substantially parallel to the well casing material of the first well, wherein the device comprises a conductor disposed lengthwise between the well cement of the first well and the well casing material of the first well along the length of the first well and which spans less than a circumference of the well casing material of the first well.

20. The system of claim 13, wherein the power supply coupling the current to the second well comprises the power supply applying a voltage potential difference between the first well and the second well; and wherein the range determination module further comprises receiving, by the sensor, electric field strength measurements from the first and second well based on the applied voltage potential difference to determine the relative positioning to the third well.

21. A method, comprising:
installing a conductive well casing within a first target well and second target well;
cementing around an outside of the well casing of the first target well and second target with well cement; and
prior to or during the cementing, installing a first transmitter in the first target well that transmits first electromagnetic waves including embedding the first transmitter lengthwise between the well cement of the first target well and the well casing of the first target well, the first transmitter installed continuously along a length of the first well, substantially parallel to the well casing of the first target well;

prior to or during the cementing, installing a second transmitter in the second target well that transmits second electromagnetic waves including embedding the second transmitter lengthwise between the well cement of the second target well and the well casing of the second target well, the second transmitter installed continuously along a length of the second well, substantially parallel to the well casing of the second target well;

a sensor disposed in a drilling well determining a field strength of ranging signals corresponding to the transmitted first and second electromagnetic waves; and a range determination module determining relative positioning between the drilling well and the first target well and second well based on the determined field strength of ranging signals.

22. The method of claim 21, wherein said determining relative positioning comprises determining a distance and direction from the drilling well to the first and second target well, based on direct transmission of the first and second electromagnetic waves from the first and second transmitter disposed in the first and second target well, respectively, to the sensor disposed in the drilling well.

23. The method of claim 21, further comprising:
determining a distance and direction from the drilling well to the first and second target well, based on backscatter transmission of the ranging signals from the first and second target well to sensors disposed in the drilling well.

24. The method of claim 21, further comprising:
receiving the ranging signals through the conductive well casing, by the sensor comprising a waveguide.

25. The method of claim 21, further comprising:
exciting the transmitter with a power supply coupled to a well head of the first and second target well respectively, to generate the first and second electromagnetic waves.

26. The method of claim 25, wherein said determining relative positioning comprises determining a distance and direction to the first and second target well from the drilling well having magnetometers disposed therein to receive the ranging signals.

27. The method of claim 21, wherein the sensor determines the field strength of the ranging signals in multiple directions, and wherein said determining relative positioning comprises determining, based on the field strength determinations in multiple directions, a distance and direction between the drilling well and the first target well.

28. The method of claim 21, wherein the first transmitter comprises a device which produces the first electromagnetic waves, the device disposed lengthwise between the well cement of the first well and the well casing material of the first well continuously along a length of the first well, substantially parallel to the well casing material of the first well, wherein the device comprises a conductor disposed lengthwise between the well cement of the first well and the well casing material of the first well along the length of the first well and which spans less than a circumference of the well casing material of the first well.

29. The method of claim 21, wherein a power supply applies a voltage potential difference between the first well and the second well; and wherein the range determination module further comprises receiving, by the sensor, electric field strength measurements from the first and second well based on the applied voltage potential difference and determining the relative positioning to the third well based on the electric field strength measurements from the first and second well.

* * * * *